Patented Jan. 26, 1943

2,309,289

UNITED STATES PATENT OFFICE 2,309,289

PROCESS FOR DISINFECTING SEEDS

Adolf Zade, Stockholm, Sweden

No Drawing. Application February 12, 1940, Serial No. 318,556. In Sweden February 20, 1939

12 Claims. (Cl. 167—38)

The present invention relates to a process for disinfecting seeds by means of organic mercury compounds contained in a vehicle of organic liquids, e. g., dissolved or dispersed in the same, as well as a suitable composition of matter for carrying out said process.

In the hitherto proposed processes for disinfecting seeds using liquids, the liquid vehicle has not contained a sufficiently high concentration of organic mercury compounds to make it possible to completely avoid the difficulties which are connected with the use of a large amount of liquid, particularly when treating the seeds in mixing drums or the like. To obtain a satisfactory disinfection of the seeds it is, namely, necessary to use a quantity of the mercury compound in question which is of the order of magnitude of 0.05 gram per kilogram of seed. Owing to the low dissolving power of oils previously suggested for the purpose of seed disinfecting, however, it is necessary to use such a large amount of the vehicle in question for obtaining the requisite ratio of mercury compound to amount of seed, that the treated seeds will become sticky, whereby their sowing is hampered or even rendered impossible. The use of large amounts of liquid vehicles, furthermore, is very often detrimental to the germinating power of the seeds.

It has now been discovered that certain hydrocarbons, such as benzene and others, as well as alcohols, esters, ketones, etc., are extremely useful as vehicles for organic mercury compounds in the disinfecting of seeds. Low viscous fractions of coal-tar ("gas tar") have proven to be of particular usefulness for the intended purpose. So-called heavy-oil, a fraction of coal tar with a boiling point range of from about 140° C. to 200° C., has for instance a capacity of dissolving about twice the amount of ethyl and methyl mercury halogens that is required to give a liquid compound of suitable strength.

These favorable dissolving faculties of the aromatic hydrocarbons and other organic liquids makes possible their dilution with other substances, such as vegetable oils or fuel oil and similar petroleum distillates, which lack any specific faculty of acting as vehicles for the mercury compounds in question, mostly due to their low dissolving power, but which are useful as a means of improving the power of the disinfecting mixture to spread over the surface of the seeds and even to penetrate the hull.

A seed disinfecting liquid of such composition may be given the desired high concentration of the fungicidal mercury compound, at the same time as the oil-component will make it possible to obtain a spreading power which allows of an even distribution of the disinfecting substance over the surface of the seeds without producing any stickiness. At a concentration of for instance one half of one percent by weight of the fungicide, which represents a suitable approximate lower limit, it is thus already possible to employ considerably less amounts of liquid vehicle than what has been hitherto proposed. By this, it is possible to avoid the danger of stickiness as well as injuries to the germinating power of the seeds, while fully utilizing the valuable faculty of the oil to evenly distribute the fungicidal substance in the form of a thin film over the surface of the seeds.

Seeds treated according to the new process show a considerable improvement in their properties over seeds treated by ordinary dust disinfection methods. The fungicidal action of the new mixture is much higher than that of the more or less dry mixtures used in dust disinfection, in which the vehicle, mostly to as much as 90%, consists of a dry powder. By using organic liquids as a vehicle for the disinfecting compound the latter will become uniformly spread over the surface of the seeds and even be capable of penetrating into the hull. A better action is also obtained thanks to the adhering of the vehicle to the seed, whereby losses due to dusting are avoided.

A particularly great advantage of the invention rests in the fact that very small proportions of the liquid disinfecting mixture are employed. The amount is normally less than 10 grams of mixture per each kilogram of seed to be treated. Seed disinfection with such low proportions of liquid is hitherto unknown. The use of such small quantities makes the new process economical and simple without any danger for the seeds not becoming sufficiently covered by the liquid over their entire surface. When using aqueous solutions it is necessary to employ much larger quantities of liquid, because of the fact that the water is rapidly absorbed by the seeds. The mixtures used according to the invention, on the other hand, will rapidly spread on the entire surface and thereby form a continuous cover without making the seeds sticky or slippery or impairing any of their useful properties.

The oil component may consist of mineral, animal and vegetable oils, such as benzine, fuel oil and similar petroleum distillates of natural or synthetic origin, paraffin oil, soyabean oil, linseed oil, whale oil, tall oil, etc., alone or in mixture with each other. The quantity of solubility increasing additions of alcohols, esters, ketones, aromatic hydrocarbons, etc., is of course dependent on the kind and nature of the oil as well as its own solvent power for the mercury compound in question. Equal parts of oil and solubility increasing addition are as a rule employed, altho the proportions may naturally deviate considerably from this without departing from the inventive idea. It is even in certain cases possible to completely dispense with any addition of such solubility increasing substances.

As examples of suitable mixtures to be used according to the invention the following may be mentioned:

Example 1

2.6-3.0 grams of an organic mercury compound having the formula RHgX, in which R represents alkyl or aryl and X stands for an inorganic acid radical, is incorported with 97-97.4 grams of a blend of so-called heavy-oil (coal tar fraction, B. P. r. 140°-200° C.) and fuel oil (petroleum distillate) making a total of 100 grams of mixture. For disinfecting one kilogram of rye, wheat or barley seed in a mixing drum 1.7-2.0 grams of this mixture are used, for one kilogram of oat 3.0 grams and for one kilogram of beet seed 5.0-6.0 grams.

Example 2

2.6-3.0 grams of an alkoxethyl mercury compound is incorporated in 97-97.4 grams of a vehicle composed of one-third part of xylene and two-thirds of whale oil, or of one-third part of alcohol, one-sixth part of xylene and one-half part of fuel oil. For disinfecting one kilogram of rye, wheat or barley in a mixing drum 1.7-2.0 grams of above mixture are used, for one kilogram of oat likewise 3.0 grams, and for one kilogram of beet seed 5.0-6.0 grams.

Example 3

2.3-3.0 grams of methyl mercury bromide is incorporated in a vehicle consisting of equal parts of benzene and fuel oil. For disinfecting one kilogram of rye, wheat or barley in a mixing drum 1.7-2.0 grams of above mixture are used, for one kilogram of oat likewise 3.0 grams, and for one kilogram of beet seed 5.0-6.0 grams.

Example 4

2.0-2.5 grams of methyl mercury chloride incorporated in 97.5-98 grams of a vehicle composed of equal parts of oleic acid and benzene. The mixture is used in about the same amounts for the same purposes as described in Examples 1-3.

The expression oil in the specification and claims refers to that group of substances which are defined as oleaginous liquids insoluble in water.

I claim:

1. In the disinfection of seeds, the process which comprises contacting seeds to be disinfected with a fungicidal organic mercury compound dissolved in an oily vehicle in a concentration amounting to not substantially less than about 0.5 per cent by weight, the quantity of solution employed being sufficient to cause a thin film to spread over the seeds but not substantially more than about 10 grams of solution per kilogram of seeds, whereby the production of sticking between the seeds is prevented and the germinating power of the seeds remains substantially unimpaired.

2. The process of claim 1 wherein said oily vehicle comprises a mixture of an oil, adapted to produce spreading of said solution over the seeds to be disinfected, and a mutual solvent for said oil and for said organic mercury compound.

3. In the disinfection of seeds, the process which comprises contacting seeds to be disinfected with a fungicidal organic mercury compound of the type represented by the formula RHgX, in which R represents alkyl or aryl and X represents an inorganic acid radical, said mercury compound being dissolved in an oily vehicle in a concentration amounting to not substantially less than about 0.5 per cent by weight, the quantity of solution employed being sufficient to cause a thin film to spread over the seeds but not substantially more than about 10 grams of solution per kilogram of seeds, whereby the production of sticking between the seeds is prevented and the germinating power of the seeds remains substantially unimpaired.

4. In the disinfection of seeds, the process which comprises contacting seeds to be disinfected with a fungicidal organic mercury compound of the type represented by the formula RHgX, in which R represents alkyl or aryl and X represents an inorganic acid radical, said mercury compound being dissolved in an oily vehicle in a concentration amounting to not substantially less than about 0.5 per cent by weight, said oily vehicle comprising a mixture of an oil, adapted to produce spreading of said vehicle over the seeds and a mutual solvent for said oil and said mercury compound, the quantity of solution employed being sufficient to cause a thin film to spread over the seeds but not substantially more than about 10 grams of solution per kilogram of seeds, whereby the production of sticking between the seeds is prevented and the germinating power of the seeds remains substantially unimpaired.

5. The process of claim 4 wherein said solvent is an aromatic organic compound.

6. The process of claim 4 wherein said solvent is a water soluble organic compound.

7. The process of claim 4 wherein said solvent is alcohol.

8. The process of claim 4 wherein said solvent is xylene.

9. The process of claim 4 wherein said oil is a vegetable oil.

10. The process of claim 4 wherein said oil is a mineral oil.

11. The process of claim 4 wherein said oil is a fatty oil.

12. The process of claim 4 wherein said oil is fuel oil.

ADOLF ZADE.